United States Patent
Sekine et al.

(10) Patent No.: US 6,842,272 B2
(45) Date of Patent: Jan. 11, 2005

(54) HOLOGRAM PLATE AND ITS FABRICATION PROCESS

(75) Inventors: Keiko Sekine, Tokyo (JP); Hiroshi Kishimoto, Tokyo (JP); Masaki Katsumata, Tokyo (JP); Yoichi Higuchi, Tokyo (JP); Nobuhiko Ichikawa, Tokyo (JP); Tadatsugu Onuma, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

(21) Appl. No.: 10/800,678

(22) Filed: Mar. 16, 2004

(65) Prior Publication Data

US 2004/0174579 A1 Sep. 9, 2004

Related U.S. Application Data

(62) Division of application No. 09/765,373, filed on Jan. 22, 2001, now Pat. No. 6,714,329.

(30) Foreign Application Priority Data

Jan. 21, 2000 (JP) ........................................ 2000-012578
Mar. 24, 2000 (JP) ........................................ 2000-083601
Apr. 26, 2000 (JP) ........................................ 2000-126077

(51) Int. Cl.$^7$ ............................................... G02B 5/32
(52) U.S. Cl. .............................. 359/25; 359/15; 359/22; 359/900; 359/1; 359/35
(58) Field of Search ........................... 359/1, 9, 12, 15, 359/20, 22, 25, 35, 900

(56) References Cited

U.S. PATENT DOCUMENTS

| 6,081,354 A | 6/2000 | Gambogi, Jr. et al. |
| 6,111,670 A * | 8/2000 | Hattori et al. ................. 359/15 |
| 6,157,474 A | 12/2000 | Orr et al. |

* cited by examiner

*Primary Examiner*—Fayez Assaf
(74) *Attorney, Agent, or Firm*—Sughrue Mion, PLLC (57) ABSTRACT

The invention provides a hologram plate which is used with the double-focus replication process, and which is integrated with a spacer to impart marring resistance thereto, and is integrated with a light absorbing layer to allow zero-order light and first-order light to have substantially the same intensity. This hologram plate 42 comprises an array of collective element holograms for diffracting parallel light incident thereon at a specific wavelength and a specific incident angle in such a way that the light is converged onto a specific focal length position. The hologram plate 42 is a multilayer structure made up of a first transparent substrate 31, a hologram layer 32, an adhesive layer 33 and a second transparent substrate 41. The second transparent substrate 42 defines a surface in contact with a hologram photosensitive material 53 during hologram replication.

15 Claims, 8 Drawing Sheets

HOLOGRAM PLATE AND ITS FABRICATION PROCESS

This is a divisional of application Ser. No. 09/765,373 filed Jan. 22, 2001, now U.S. Pat. No. 6,714,329; the disclosure of which is incorporated herein by reference.

BACKGROUND OF THE INVENTION

The present invention relates generally to a hologram plate and its fabrication process, and more specifically to a hologram plate designed to replicate a hologram array comprising collective element holograms such as hologram color filters, and its fabrication process.

The present invention is also concerned with a multifaceted hologram plate and its fabrication process.

Further, the present invention is directed to the construction of a protective film for a hologram plate.

In JP-A 06-222361, etc., the applicant has already come up with a hologram-harnessing color filter for the purpose of greatly increasing the efficiency of utilization of liquid crystal display backlights, etc. This hologram color filter is basically made up of an array of a transmission type of collective element holograms capable of diffracting parallel light incident thereon at a specific wavelength and a specific angle of oblique incidence in such a way that it is converged on a specific focal distance position.

To use such a hologram array as a hologram plate to replicate another hologram array having similar properties by a hologram replication process, for instance, a first hologram plate is fabricated in the form of a computer-generated hologram (CGH). Then, the first hologram plate is replicated by the hologram replication process to fabricate a hologram plate, from which the final product is fabricated by a similar hologram replication process.

To replicate such a transmission type of collective element hologram array as mentioned above, the applicant has filed a patent application (JP-A 09-90860) to come up with a process wherein when replicas of the first plate and hologram plate are fabricated, the distance between the hologram plate and a hologram photosensitive material is fixed to substantially double the focal length of each element hologram to make a hologram replica having similar properties to those of the hologram plate. This process is now explained with reference to FIG. 12.

Figure 12:
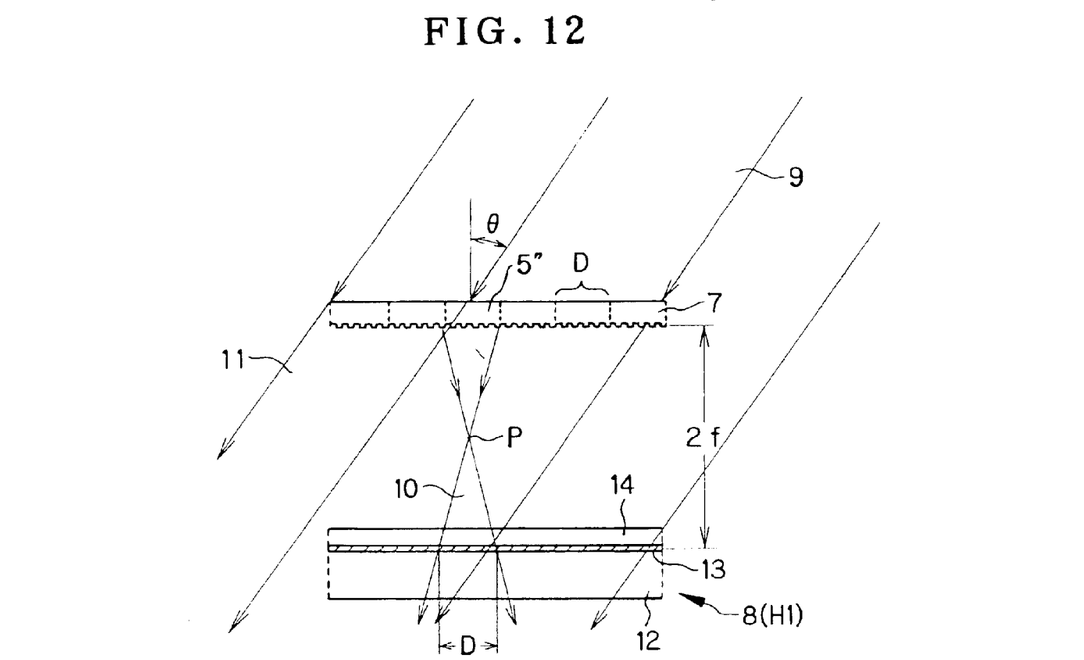
FIG. 12 is illustrative of an arrangement of how to fabricate a hologram replica from a CGH array plate by a conventional double-focus replication process.

FIG. 12 is illustrative of how to fabricate a hologram array 5 providing a hologram color filter from a CGH array plate 7 in one single replication operation. A plate for a hologram array 5 providing a hologram color filter is constructed in the form of a CGH array 7. The distance from the relief surface of the CGH array plate 7 to a photosensitive layer 13 is fixed to $2f$ that is double the focal length f of each CGH 5" so that a hologram photosensitive material 8 is spaced away from the CGH array plate 7. Laser light 9 having a specific wavelength is entered into the CGH array plate 7 at a specific angle of incidence, so that diffracted light 10, converged by the diffraction action of each CGH 5" from convergent light to divergent light, and straightforwardly traveling transmitted light 11 interfere in the photosensitive layer 13 of the hologram photosensitive material 8.

Here let D represent the diameter of a recording area of each element hologram 5" of the CGH array plate 7. Then, the diffracted light 10, once converged on a position P located at a distance f from the relief surface of each CGH 5", is converged on a $2f$ position into a divergent light beam having the same diameter D. Accordingly, if the divergent light and the straitghtforwardly traveling transmitted light 11 interfere in the photosensitive layer 13 located at this position, the diameter of the hologram interference fringe recording area becomes equal to D, and the pitch between adjacent replicated element holograms becomes equal to that between adjacent element holograms 5" of the CGH array plate 7 as well. In addition, when light traveling in the opposite direction to the transmitted light for hologram array replication is entered in the thus replicated hologram array from the glass substrate 12 side, the diffracted light is converged on a position P at a length f from the photosensitive layer 13 with hologram interference fringes recorded therein, and so has the same diameter as the focal length of each element hologram 5" of the CGH array plate 7. In other words, a hologram array completely identical with the CGH array plate 7 is obtained.

Figure 13:
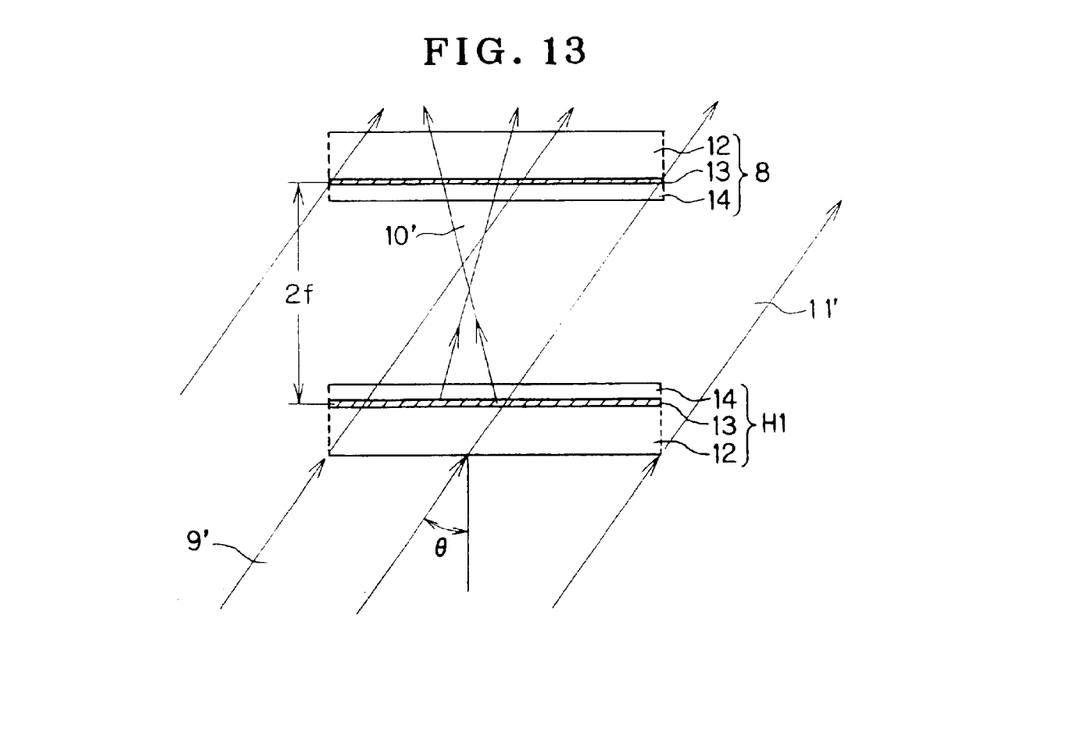
FIG. 13 is illustrative of an arrangement of how to again make replication using a hologram replica obtained in the arrangement of FIG. 12 as a hologram plate.

The hologram array replicated from the CGH array plate 7 in such an arrangement as shown in FIG. 12 is then used as a hologram plate to obtain the end product. FIG. 13 is illustrative of one arrangement of how to carry out such second replication operation. In FIG. 13, H1 stands for an intermediate hologram array obtained by replication in the arrangement of FIG. 12. This intermediate hologram array H1 is again used as a hologram plate for replication purposes. In this case, the hologram photosensitive material 8 is located on the side of the plate 7 for the replication of the intermediate hologram array H1, and reconstructing illumination laser light 9' is entered in the intermediate hologram array H1 from the opposite direction to the transmitted light 11 for the replication of the intermediate hologram array H1, and the distance from the diffraction surface of the intermediate hologram array H1 to the photosensitive layer 13 of the hologram photosensitive material 8 is fixed to $2f$ that is double the focal length f of each element hologram. When the reconstructing illumination laser light 9' is entered in the intermediate hologram array H1 in such an arrangement, light 10' diffracted by each element hologram of the intermediate hologram array H1 travels in the opposite direction to the diffracted light 10 of FIG. 12 and, once converged, is converted at the $2f$ position to a divergent light beam having the same diameter D. Accordingly, diffracted light 10' and straightforwardly traveling transmitted light 11' interfere in the photosensitive layer 13 located at this position as in the case of FIG. 12, so that an array of element holograms having the same focal length f is replicated and recorded at a pitch d in the area having the same diameter D.

The feature of this process is that a hologram similar in properties to the hologram plate can be fabricated even when the hologram plate is in no perfect contact with the replica. In what follows, the hologram replication process in such an arrangement will be called a double-focus replication process.

Incidentally, hologram photosensitive materials such as photopolymers are generally poor in marring resistance whether in an unrecorded state or in a state subjected to post-recording treatments. When replication is carried out with a hologram plate in close contact with a hologram photosensitive material, it is likely that the hologram on the hologram plate side is immediately damaged and some of the photosensitive material on the replication side peels off, depositing onto the hologram on the hologram plate side. Such depositions are hardly removable.

When a hologram has such a focal length as mentioned above, there is a variation in the focal length of replicas due to a contact gap at the time of replication, and a variation in gap thickness leads to a variation in the focal length of replicas.

It is desired that the zero-order light and first-order light diffracted by the hologram plate have substantially the same intensity at the position of the hologram photosensitive material. To this end, it is required to place the refractive index modulation under severe control. However, this control is difficult on practical levels.

The hologram (intermediate hologram array H1) used for the replication of the end products is herein called the hologram plate. When a hologram plate having only one hologram (hologram color filter) equivalent to one segment is used for the replication of such a color filter as mentioned above, however, replication efficiency becomes worse.

To avoid this, a process has been proposed in the art, which process makes use of a hologram plate obtained by translating a CGH plate 7 with respect to one large hologram photosensitive material 8 for a plurality of replication cycles wherein, for instance, four or eight holograms are exposed to light to form four or eight juxtaposed holograms in the hologram photosensitive material, so that four or eight holograms can be simultaneously replicated in one replication operation. Such a hologram plate with a plurality of juxtaposed holograms is called a multifaceted hologram plate.

As shown in FIG. 13, for instance, the multifaceted hologram plate is prepared in plural replication operations, using a CGH plate with respect to one; large hologram photosensitive material. However, when at least one of plural exposure operations (replication operations from the CGH plate) is improper, the resultant multifaceted hologram plate cannot be used or fails to provide a hologram plate having good replication efficiency.

In view of such prior art states as mentioned above, the first object of the present invention is to provide a hologram plate used with the double-focus replication process, which is integrated with a spacer to impart marring resistance thereto, and is integrated with a light absorbing layer to allow zero-order light and first-order light to have substantially the same intensity, and its fabrication process.

The second object of the present invention is to provide a multifaceted hologram plate which can have hologram segments of improved properties, can be used for efficient replication, and has improved durability, and its fabrication process.

The third object of the present invention is to provide an easily releasable protective film for a hologram plate, which prevents surface marring, wearing and contamination at the time of contact replication or removal of foreign matters.

SUMMARY OF THE INVENTION

According to the present invention, the aforesaid first object is achieved by the provision of a hologram plate comprising an array of a transmission type of collective element holograms that diffract parallel light incident thereon at a specific wavelength and a specific angle of incidence in such a way that the parallel light is converged on a specific focal length position, characterized by comprising a multilayer structure made up of a first transparent substrate, a hologram layer, an adhesive layer and a second transparent layer, said second transparent substrate defining a surface into contact with a hologram photosensitive material when hologram replication is carried out.

Preferably in this case, the second transparent substrate should have a thickness that is substantially twice the focal length of each collective element hologram, inclusive of the thickness of the adhesive layer.

Preferably, a water-soluble protective layer should be interleaved between the hologram layer and the adhesive layer.

Preferably in the case mentioned just above, the second transparent substrate should have a thickness that is substantially twice the focal length of each collective element hologram, inclusive of the thicknesses of the adhesive layer and water-soluble protective layer.

The diffraction efficiency of the hologram layer may be preset in such a way as to allow the zero-order light and first-order light diffracted by the hologram layer to have substantially the same intensity.

An absorbing layer may be interleaved at any desired position between the hologram layer and the second transparent layer, and a light absorbing material is dispersed throughout the absorbing layer in such a way as to allow the zero-order light and first-order light diffracted by the hologram layer to have substantially the same intensity.

An absorbing layer may be located on the surface of the second transparent substrate, and a light absorbing material is dispersed throughout the absorbing layer in such a way as to allow the zero-order light and first-order light diffracted by the hologram layer to have substantially the same intensity.

According to the present invention, there is also provided a process for fabricating the hologram plate for the purpose of achieving the aforesaid first object of the present invention, characterized in that:

said adhesive layer comprises an ultraviolet curing adhesive agent, said multilayer structure, obtained by forming said hologram layer on said first transparent substrate and then superposing said second transparent substrate on said hologram layer with an uncured ultraviolet curing adhesive agent interleaved therebetween, is spun to spin an extra portion of said adhesive agent out of the periphery thereof, thereby making said adhesive layer uniform, while the rpm of said multilayer structure is controlled to obtain a desired thickness, and said multilayer structure is irradiated with ultraviolet radiation through said first transparent substrate or said second transparent substrate to cure said adhesive agent.

Preferably in this case, the hologram layer is exposed to p-polarized light. P-polarized light is more reduced in interface reflection than s-polarized light, so that unnecessary interference fringes can be reduced during exposure and An (refractive index modulation) can be controlled to a reduced value as well.

However, when the diffraction efficiency of the CGH plate is too low as an example, the use of s-polarized light is preferable because An can be increased with an increased diffraction efficiency.

In the present invention for the purpose of achieving the aforesaid first object, the hologram plate comprises a multilayer structure made up of a first transparent substrate, a hologram layer, an adhesive layer and a second transparent layer and the second transparent substrate defines a surface in contact with a hologram photosensitive material during hologram replication, so that the second transparent substrate can function as a protective layer to make the hologram plate resistant to marring. In addition, the second transparent substrate can be used as a spacer for a double-focus replication process wherein the distance between the hologram plate and the hologram photosensitive material is set at substantially double the focal length of each collective element hologram, so that replicas can be fabricated with constant focal lengths.

An absorbing layer is located between the hologram layer and the adhesive layer or at other position to allow the zero-order light and first-order light diffracted by the hologram layer to have substantially the same intensity, so that hologram replicas of high diffraction efficiency can be obtained.

The present invention has been described with reference to the double-focus fabrication process. It is noted, however, that it is actually important and desirous to keep the distance between the hologram plate and the photosensitive material constant in consideration of the total thickness of all members inclusive of the adhesive layer, protective layer and index matching liquid.

When the first replication is carried out in the contact mode and the second is carried out by the double-focus replication process, it is desired that the distance coincide with the value obtained by the subtraction of the first replication gap from the value double the focal length.

The aforesaid second object of the present invention is achieved by the provision of a hologram plate comprising a plurality of juxtaposed unit hologram segments, characterized in that:

one common transparent thin sheet is provided over the surfaces of said plurality of juxtaposed unit hologram segments with an adhesive agent interleaved therebetween.

Preferably in this case, each unit hologram segment should comprise a transparent substrate, a photosensitive material layer formed thereon while a hologram is recorded therein, and a protective layer formed on said photosensitive material layer.

It is here preferable that a transparent thin sheet should be bonded onto said protective layer for each unit hologram segment.

It is also preferable that said plurality of unit hologram segments should be hologram segments replicated from the same hologram plate.

Each unit hologram segment, for instance, may be a hologram color filter.

Regarding the aforesaid second object of the present invention, there is provided a process for fabricating a hologram plate comprising a plurality of juxtaposed unit hologram segments and one common transparent sheet provided over the surfaces of said unit hologram segments with an adhesive agent interleaved therebetween, characterized by comprising steps of:

preparing a plurality of unit hologram segments, adsorbing a transparent thin sheet onto the surface of a reference plate and laminating said plurality of unit hologram segments, in juxtaposed relation to each other, on said transparent thin sheet with an adhesive agent interleaved therebetween, bonding a base plate onto the back side of said plurality of juxtaposed unit hologram segments with an adhesive agent interleaved therebetween, and desorbing said transparent thin sheet from said reference plate to release said transparent thin sheet from said reference plate.

Preferably in this process, at the step of preparing a plurality of unit hologram segments, said plurality of unit hologram segments are replicated from the same hologram plate.

According to the present invention for achieving the aforesaid second object, all the unit holograms can be precisely replicated because the unit hologram segments are kept flush with one another by one common thin sheet glass provided over the plurality of juxtaposed unit hologram segments. When the hologram photosensitive material is brought into close contact with the multifaceted hologram plate with an index matching liquid applied therebetween for the purpose of hologram replication, it is extremely unlikely that an optical adhesive agent between adjacent unit hologram segments will be dissolved in the index matching liquid. If a glass sheet is used as the transparent thin sheet, improved durability is then obtained. Fabricated by the lamination of only unit hologram segments put in good alignment with good properties, the multifaceted hologram plate according to the present invention for achieving the aforesaid second object have all unit hologram segments of good quality and uniform properties, and so can be used for hologram replication with high efficiency.

According to the present invention for achieving the aforesaid third object, there is provided a hologram plate comprising a hologram layer with interference fringes formed thereon, a first layer capable of being removed with water or a solvent, which is provided on the surface of said hologram layer or a transparent layer formed thereon, and a second layer of a curing resin capable of being cured by light or heat, which is formed on said first layer.

In this hologram plate, the hologram layer may be either an amplitude type hologram layer with a metal film patterned thereon or a hologram layer comprising a hologram photosensitive material layer with interference fringes recorded therein.

The first layer may have the property of absorbing light.

This hologram plate may be applied to either a transmission type hologram or a reflection type hologram.

Thus, the hologram plate for achieving the aforesaid third object of the present invention comprises a hologram layer with interference fringes formed thereon, a first layer capable of being removed with water or a solvent, which is provided on the surface of said hologram layer or a transparent layer formed thereon, and a second layer of a curing resin capable of being cured by light or heat, which is formed on said first layer. The second layer functions as a protective layer for the hologram layer 202, thereby preventing the marring, wearing and contamination of the hologram layer, which may otherwise occur at steps of coating an index matching liquid, carrying out contact replication, removing the index matching liquid, removing foreign matters, and so on. As many holograms are replicated, the second layer, too, is subjected to marring, wearing and contamination. In this case or, for instance, when one fails to form the first layer or the second layer, the hologram plate is washed with water or boiled in boiling water, so that the protective layer can be easily removed. Then, if fresh first and second layers are provided on the hologram layer, the hologram plate can be regenerated.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Embodiments of the hologram plate according to the present invention and its fabrication process are now explained.

Figure 1:
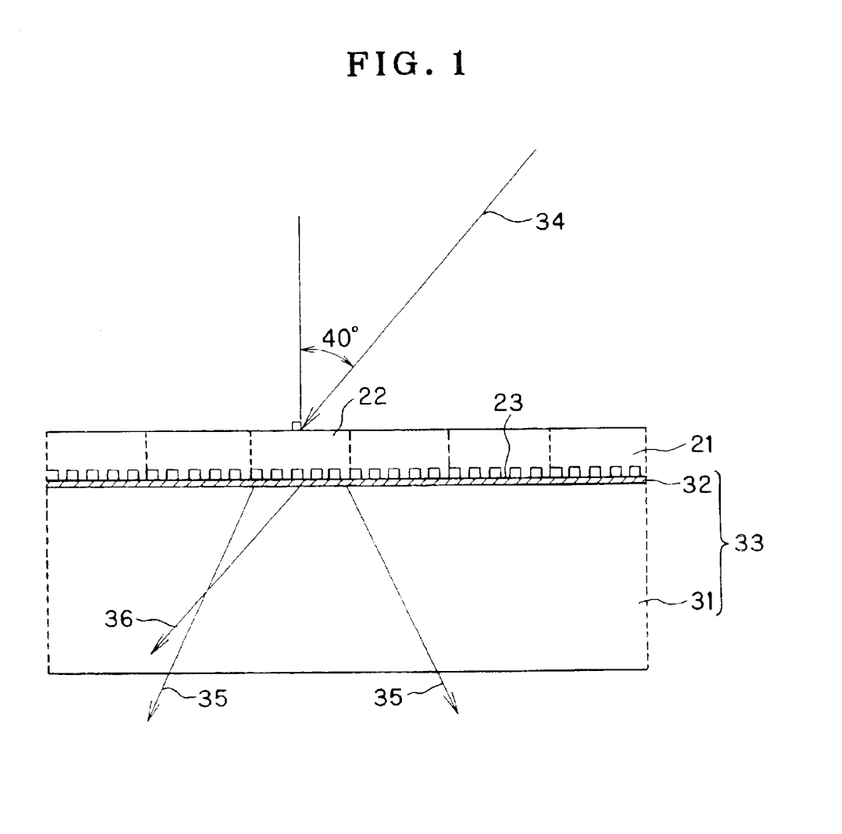
FIG. 1 is illustrative of an arrangement of how to replicate a hologram from a CGH array plate according to the first embodiment of the invention.

In the first embodiment of the present invention, the first hologram plate was fabricated in the form of a relief type computer-generated hologram (CGH) comprising an array of a transmission type of divergent element holograms. To fabricate this relief type CGH, the inference fringes of the divergent element holograms were first computed by means of a computer in such as a way that laser light of 488 nm wavelength, incident thereon at an incident angle of 40°, was diverged from a 50 $\mu$m focal length position on the incident side. Then, the interference fringes were rendered by means of electron beams on the surface of a glass substrate on which, for instance, an electron beam resist was coated, followed by development. In FIG. 1, the CGH array plate is shown at 21, the element holograms at 22, and a relief surface at 23.

On the other hand, a hologram photosensitive material in the form of a photosensitive material 32, viz., photopolymer HRF600X made by Du Pont was applied onto a glass substrate 31, viz., a 1737 glass substrate of 1.1 mm in thickness, made by Corning, thereby obtaining a hologram photosensitive material 33.

If required, a water-soluble protective layer formed of PVA (polyvinyl alcohol), etc. may be coated on the photosensitive layer 32. This protective layer acts as a barrier layer for preventing the adhesive layer 37 to be referred to later from diffusing into the photosensitive layer 32, resulting in adverse influences such as a lowering of the degree of refractive index modulation, the swelling of the interference fringes, etc.

Then, the photosensitive layer 32 of the hologram photosensitive material 33 was brought into close contact with the relief surface 23 of the CGH array plate 21. P-polarized argon laser light 34 of 488 nm wavelength was entered at an incident angle of 40° into the resultant multilayer structure from the back side of the CGH array plate 21 (facing away from the relief surface 23) to allow divergent diffracted light 35 diffracted by each element hologram 22 of the CGH array plate 21 to interfere with straightforwardly traveling transmitted light 36 in the photosensitive layer 32 of the hologram photosensitive material 33, thereby replicating a hologram from the CGH array plate 21. If, in this case, p-polarized light is used as the laser light 34, it is then possible to reduce reflections at the interface between the hologram photosensitive material 33 and the plate 21, the interface between the hologram photosensitive material 33 and air, etc., thereby preventing unnecessary interference fringes from being recorded.

Figure 2:
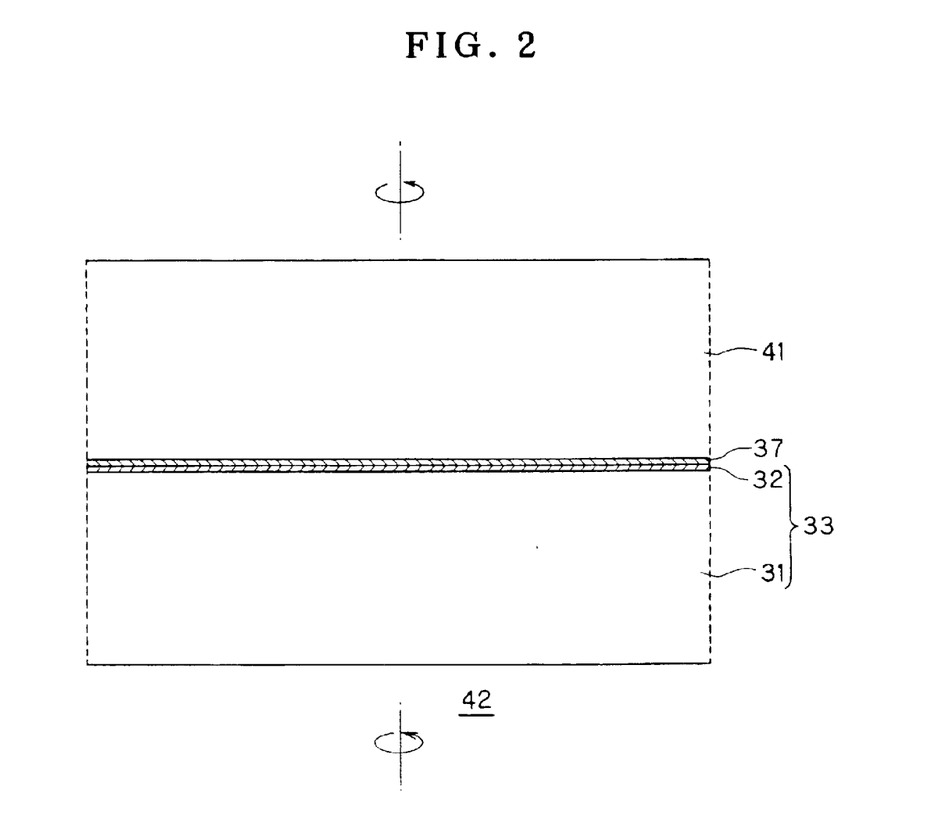
FIG. 2 is illustrative of an arrangement of how to fabricate a hologram plate according to the first embodiment from the hologram replica of FIG. 1.

After the photosensitive layer 32 had been exposed to light in a given fashion, an adhesive agent, viz., an ultraviolet curing adhesive agent 37 and a glass plate 41 acting as a spacer were placed on the photosensitive layer 32, as shown in FIG. 2. Then, the resultant multilayer structure was spun by means of a spinner to spin an extra portion of the adhesive agent 37 out of the periphery thereof, so that the adhesive layer 34 was made uniform, while the rpm of the spinner was controlled to obtain the desired thickness. In this way, the glass plate 41 was laminated on the photosensitive layer 32. Glass D263 of 100 $\mu$m in thickness, made by Shot, was used for the glass plate 41 and the spinner was spun at a fixed 2,800 rpm.

Thereafter, the adhesive agent 37 was cured by ultraviolet irradiation through the glass substrate 31 or the glass plate 41.

Figure 3:
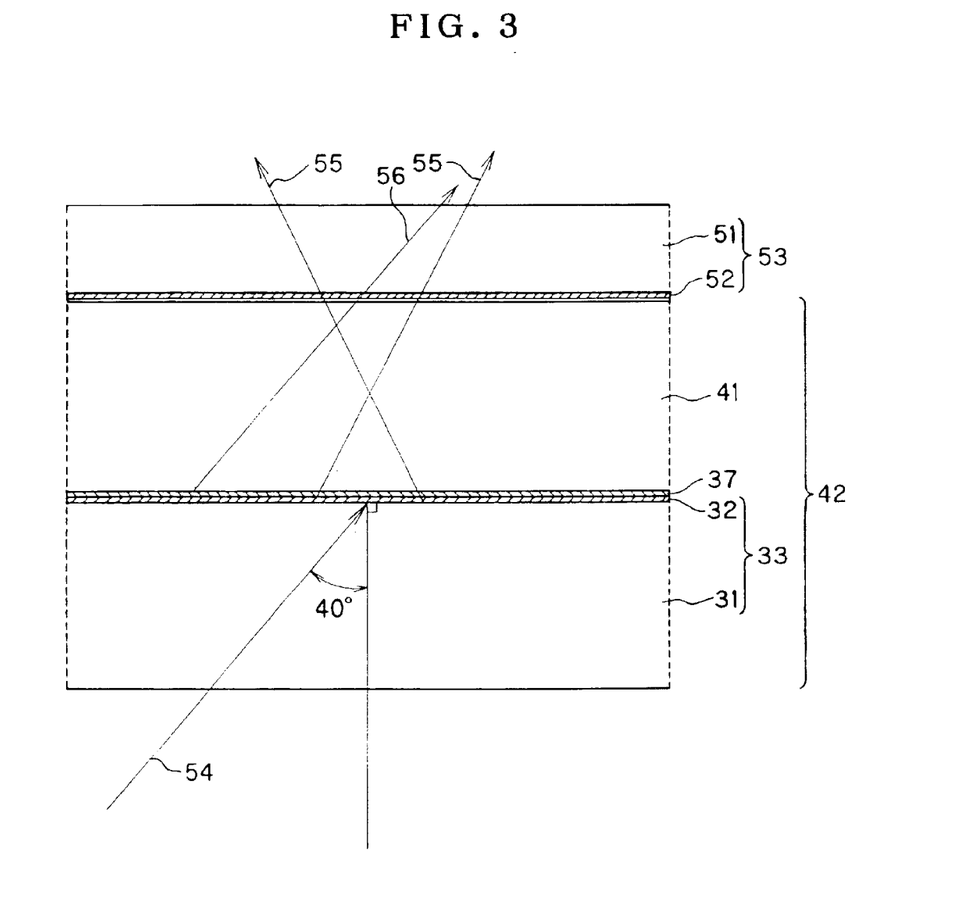
FIG. 3 is illustrative of an arrangement of how to fabricate the end hologram replica from the hologram plate of FIG. 1 by the double-focus replication process.

Then, the end product was obtained by the aforesaid double-focus replication process from the thus obtained hologram plate 42 comprising a hologram array integrated with the spacer glass plate 41. FIG. 3 is illustrative of an arrangement of how to carry out such second replication operation. According to the arrangement of FIG. 3, the hologram array 33 integrated with the spacer glass plate 41 by means of the adhesive agent 37 is used as the hologram plate 42, and a photosensitive material 53 is prepared by the application onto a glass substrate 51 of a hologram photosensitive material in the form of a photosensitive layer 52, viz., photopolymer HRF600X made by Du Pont. The photosensitive layer 52 of the hologram photosensitive material 53 is brought into close contact with the spacer glass sheet 41 of the hologram plate 42. Then, p-polarized argon laser light 54—that has the same wavelength as that of the illumination light 34 for the replication of the hologram array of hologram plate 42 and travels in the opposite direction thereto—is entered at the same incident angle of 40° into the hologram plate 42 now from the glass substrate 31. Then, diffracted light 55—that is diffracted by each element hologram of the hologram plate 42 and diverged upon converging onto the focal point—is allowed to interfere with straightforwardly traveling transmitted light 56 in the photosensitive layer 52 of the hologram photosensitive material 53 for replication purposes. The p-polarized light is used for the same reason as mentioned above. In the embodiment, each element hologram of the hologram array of hologram plate 42 has a focal length of 50 $\mu$m whereas the spacer glass plate 41 has a thickness of 100 $\mu$m that is just double the focal length of each element hologram of the hologram plate 52. Thus, the focal length of each element hologram of the replica, too, can be regulated to accurately 50 $\mu$m by the double-focus replication process.

More preferably in this embodiment, the thickness of the spacer glass plate 42 inclusive of the thickness of the adhesive agent 37 and the thickness of the absorbing layer 57 (FIG. 4) to be referred to later should be just double the focal length of each element hologram.

The hologram plate 42 used with such a double-focus replication process, because of using the glass plate 41 as the spacer, was so improved in terms of marring resistance that it could be used for hologram replication over and over. In the process of hologram replication, some of the hologram photosensitive material 53 was deposited onto the hologram plate 42. However, this hologram plate 42 could easily be washed by conventional scrubbing without causing damage thereto.

Figure 4:
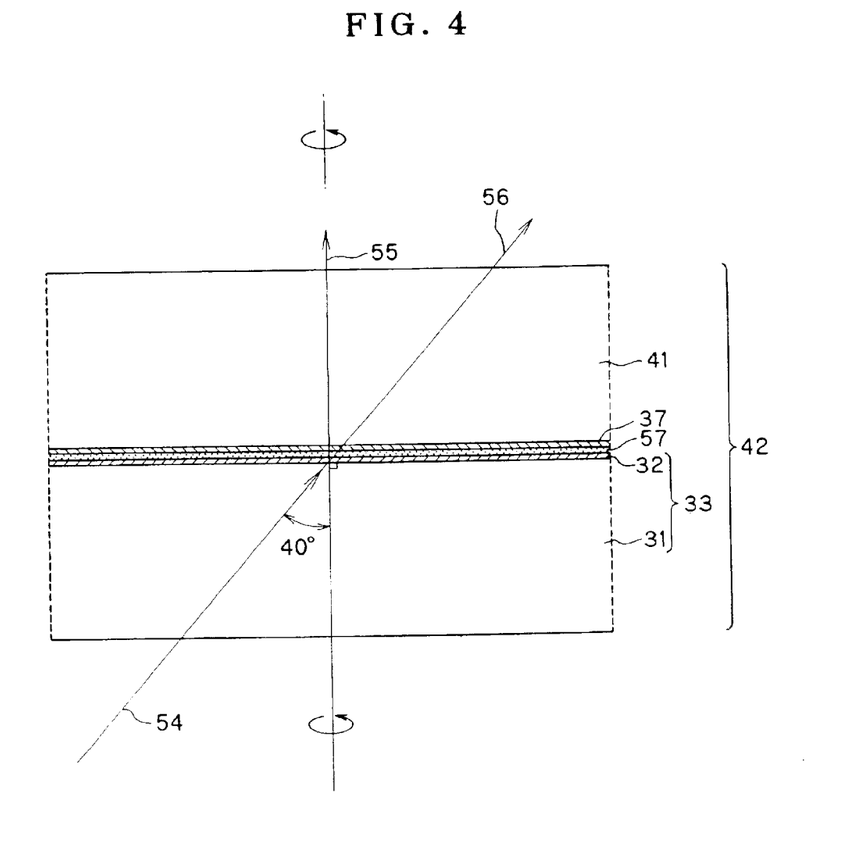
FIG. 4 is illustrative of an arrangement of how to fabricate a hologram plate according to the second embodiment from the hologram replica of FIG. 1.

The second embodiment of the invention is now explained. As shown in FIG. 1, the CGH array plate 21 is used as the hologram plate 42. As in the first embodiment, divergent diffracted light 35 diffracted by each element hologram 22 in the CGH array plate 21 is then allowed to interfere with straightforwardly traveling transmitted light 36 in the photosensitive layer 32 of the hologram photosensitive material 33 to fabricate a hologram replica of the CGH array plate 21. After exposure of the photosensitive layer 32 to light in a given fashion, as shown in FIG. 4, the photosensitive layer 32 was coated thereon with a concentration-controlled polyvinyl alcohol solution in which a red dye capable of absorbing light of 488 nm wavelength was dissolved depending on the ratio of zero-order light 56 and first-order light 55 diffracted by the hologram in the photosensitive layer 32 to form an absorbing layer 57 thereon. Following this, the adhesive agent, viz., the ultraviolet curing adhesive agent 37 and the glass plate 41 acting as a spacer were placed on the absorbing layer 57, as in the first embodiment. Then, the resultant multilayer structure was spun by means of a spinner to spin an extra portion of the adhesive agent 37 out of the periphery thereof, so that the adhesive agent 34 layer was made uniform, while the rpm of the spinner was controlled to obtain the desired thickness, thereby laminating the glass plate 41 on the absorbing layer 57 whereupon the adhesive agent 37 was cured by ultraviolet irradiation thorough the glass substrate 31 or the glass plate 41. Finally, as in the first embodiment, the end product of high diffraction efficiency could be obtained by the double-focus replication process according to the arrangement of FIG. 3.

In this case, the absorbing layer 57 acts as follows. Usually, the zero-order light 56 is higher in intensity than the first-order light 55, and so is less susceptible to efficient interference even when it interferes with the latter in the photosensitive layer 52. However, the optical path taken by the zero-order light 56 in the absorbing medium is longer than that by the first-order light 55, because the zero-order light 56 transmits obliquely through the absorbing layer 57 whereas the first-order light 55 transmits almost vertically as compared with the zero-order light 56. By control of the concentration and thickness of the absorbing layer 57, it is thus possible to decay the zero-order light 56 of higher intensity in a larger proportion and, hence, make the zero-order light 56 and first-order light 55 have substantially the same intensity upon arrival at the photosensitive layer 52, so that they can interfere with each other with high efficiency. It is thus possible to obtain replicas of high diffraction efficiency.

It is here noted that the absorbing layer 57 may be located between the glass plate 41 and the adhesive agent 37 or on the side of the glass plate 41 that faces away from the glass substrate 31, to say nothing of the FIG. 4 position.

Alternatively, it is acceptable to dispense with such an absorbing layer 57. In this case, however, it is required to regulate the ratio of the zero-order light and the first-order light diffracted by the hologram in the photosensitive material 32 to substantially 1:1 by some post-exposure treatments of the photosensitive layer 32. For instance, when photopolymer HRF600X made by Du Pont is used, it is heat treated at 120° C. for 2 hours after exposure to bring the diffraction efficiency of the first-order light up to almost 100%. However, if this heat treatment is carried out at 120° C. for 10 minutes, it is then possible to fix the diffraction efficiencies of the zero-order light and first-order light to substantially 50% and 50%, respectively. It is here noted that by curtailing the post-exposure heat-treatment time as mentioned above, it is also possible to reduce changes in the angles of inclination of interference fringes due to the deformation of the hologram photosensitive material which may occur by long-term heating, variations in the interference fringe plane, etc.

When the absorbing layer 57 is provided, it is possible to regulate the ratio of the zero-order light and the first-order light to substantially 1:1 by means of (1) thickness control of the absorbing layer 57, (2) control of heat-treatment conditions, (3) thickness control of the photosensitive layer 32, etc. Particularly preferred control can be achieved by (1) combined with (3). In this case, it is possible to determine the properties of the absorbing layer 57 in view of the ratio of the zero-order light and the first-order light after the post treatment and, hence, gain more accurate control.

Regulation of the ratio of the zero-order light and the first-order light diffracted by the hologram in the photosensitive layer 32 to substantially 1:1 may also be achieved by reducing the thickness of the photosensitive layer 32 in the absence of the absorbing layer 57. For instance, when photopolymer HRF600X made by Du Pont is used, the diffraction efficiency of the first-order light may be regulated to substantially 100% by an ordinary post treatment at a thickness of 4.0 $\mu$m. However, if this thickness is reduced down to 2.0 $\mu$m, it is then possible to fix the diffraction efficiencies of the zero-order light and the first-order light to substantially 50% and 50%, respectively.

In the aforesaid embodiments, an array comprising divergent element holograms is used for the CGH array plate 21 so as to obtain a hologram array of hologram plate 42 from the CGH array plate 21 by a contact hologram replication process. However, when a hologram array of hologram plate 42 is obtained from the CGH array plate 21 by the double-focus replication process as in the case of FIG. 5, an array of collective element holograms should be used for the CGH array plate 21.

The hologram plate and its fabrication process for achieving the first object of the present invention have been described with reference to the first and second embodiments, respectively. Next, the hologram plate and its fabrication process for accomplishing the second object of the present invention are explained with reference to some embodiments.

FIGS. 5 to 10 are sectional views illustrative of a sequence of steps for carrying out the process for fabricating the hologram plate according to the first embodiment of the present invention for achieving the second object thereof.

Figure 5:
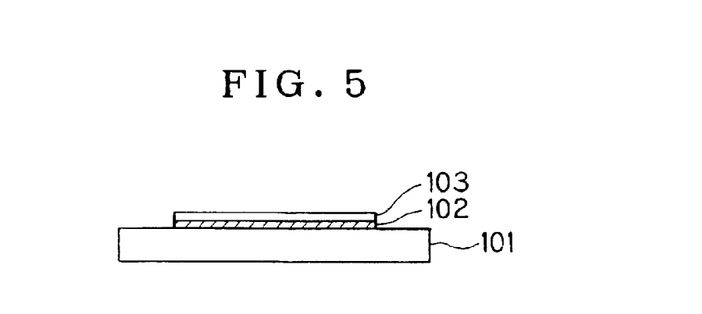
FIG. 5 is a sectional view of the first step of the process for fabricating a hologram plate for the purpose of achieving the second object of the invention.

A plurality of holograms are fabricated from such a CGH plate (the first plate) 7 as shown in FIG. 12 in one replication operation. To this end, a photopolymer or other photosensitive material layer 102, formed on a substrate glass 101 of hologram size, is provided thereon with a PVA (polyvinyl alcohol) layer 103 acting as a combined protective layer and coloring layer for preventing the occurrence of unnecessary interference fringes due to multiple interferences to prepare a photosensitive material, as shown in FIG. 5. This hologram photosensitive material is brought into close contact with the CGH array plate 7 or spaced away therefrom at a distance double the focal length f as shown in FIG. 12. Replicating illumination light (corresponding to the laser light 9 in FIG. 12) is entered into the resultant multilayer structure from the CGH plate 7 side in the case where the CGH plate 7 is of the transmission type, and the hologram photosensitive material side in the case where the CGH plate 7 is of the reflection type to allow transmitted light and diffracted light in the case where the CGH plate 7 is of the transmission type, and incident light and diffracted light in the case where the CGH plate 7 is of the reflection type to interfere in the photosensitive material layer 102, thereby making a hologram replica of the CGH plate 7.

Figure 6:
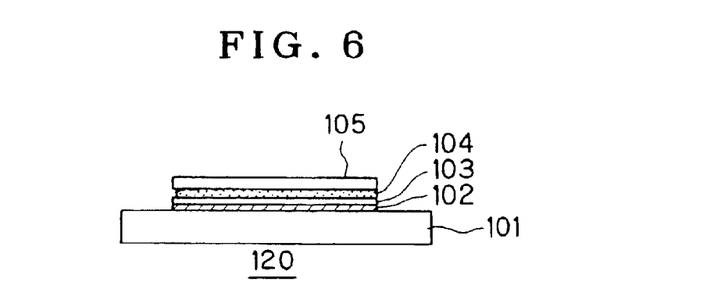
FIG. 6 is a sectional view of a step subsequent to FIG. 5.

Then, as shown in FIG. 6, a thin sheet glass 105 is laminated on the PVA layer 103 of each hologram photosensitive material with a hologram replica of the CGH plate 7, using an optical adhesive agent 104, thereby preparing a plurality of unit hologram plates 120 having similar properties. When the double-focus replication process is used in this case, the total thickness of the PVA layer 103, optical adhesive agent 104 and thin sheet glass 105 should preferably be less than the focal length f.

Figure 7:
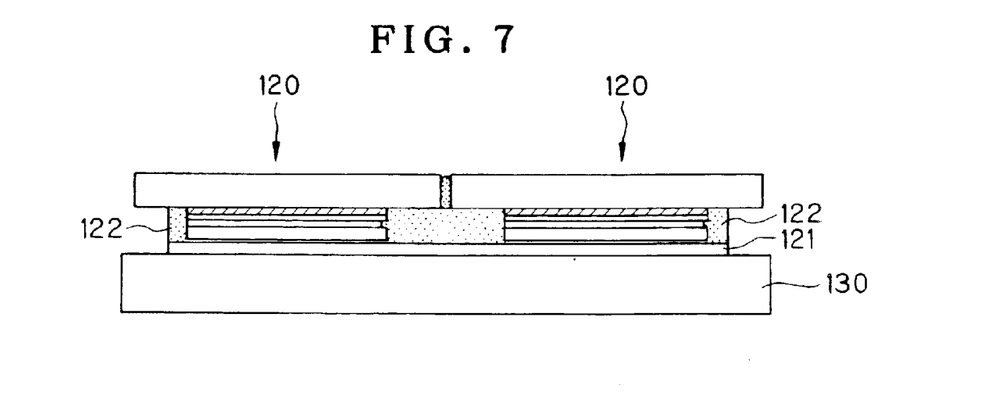
FIG. 7 is a sectional view of a step subsequent to FIG. 6.

Then, as shown in FIG. 7, a thin sheet glass 121 having a large area is brought into vacuum contact with the optical flat surface of a reference glass 130. When the double-focus replication process is used, the thickness of the thin sheet glass 121 should preferably be less than the focal length f. Using an optical adhesive agent 122, a plurality of unit hologram plates 120 in alignment are then laminated on the thin sheet glass 121 with the same force and height.

If, after the step of FIG. 6, the four side edge faces of the unit hologram plates 120 are cut out by dicing or other cutting means, and especially if the end faces of the substrate glass 101, photosensitive material layer 102, PVA layer 103, optical adhesive agent 104 and thin sheet glass 105 are cut out to put them in good alignment, air bubbles are less likely to penetrate in between adjacent unit holograms 120 at the lamination step of FIG. 7, and alignment precision is further improved.

Figure 8:
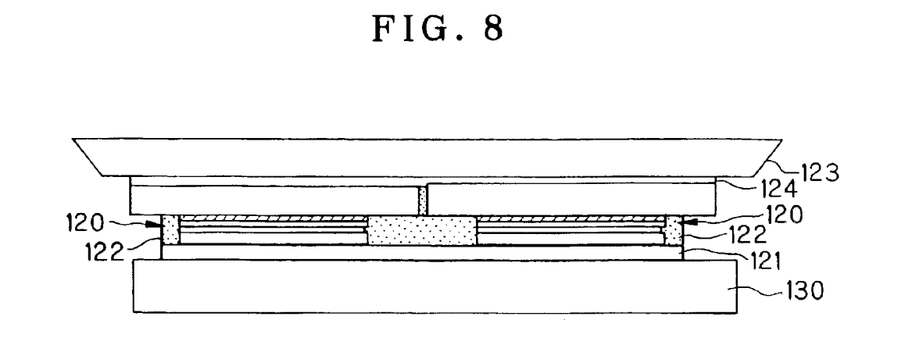
FIG. 8 is a sectional view of a step subsequent to FIG. 7.
Figure 9:
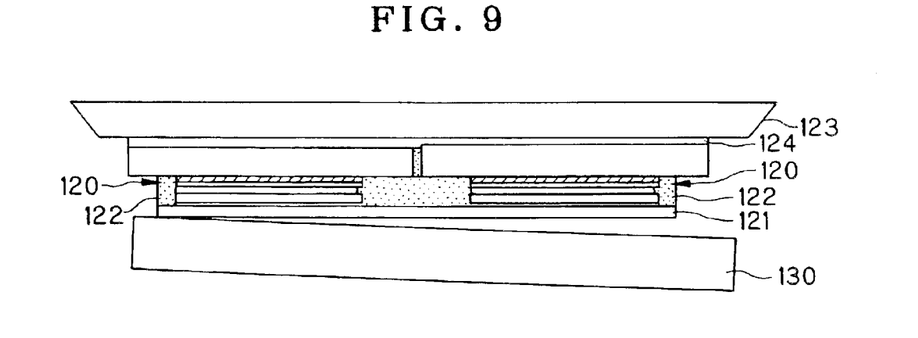
FIG. 9 is a sectional view of a step subsequent to FIG. 8.

Using an optical adhesive agent 124, a base glass 123 is bonded to the back sides of the unit hologram plates 120 put in alignment, as shown in FIG. 8, for the purposes of reinforcement and preventing penetration of a solvent (an index matching liquid) in between adjacent unit hologram plates 120. Preferably in this case, the gap between adjacent unit hologram plates 120 should be filled up with the optical adhesive agent 124. This is because an unfilled gap between adjacent unit hologram plates 120 may possibly lead to unnecessary interference fringes due to reflection and scattering at that gap upon oblique incidence of replicating illumination light.

Figure 10:
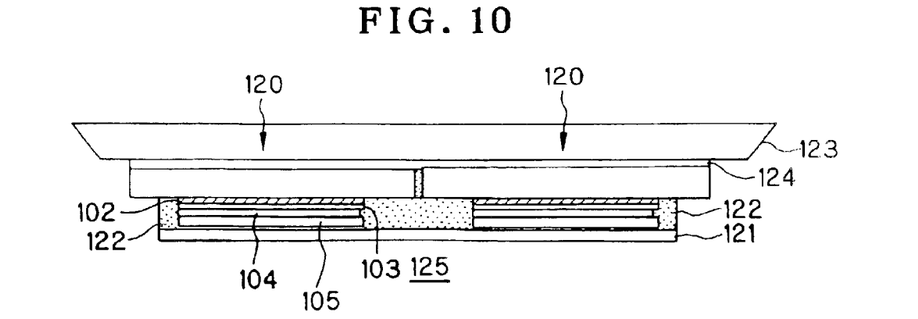
FIG. 10 is a sectional view of a multifaceted hologram plate according to one embodiment of the invention.

After the optical adhesive agent 124, etc. have been full-cured, the thin sheet glass 121 is desorbed and released from the reference glass 130 brought into vacuum contact therewith, as shown in FIG. 10, so that a multifaceted hologram plate 125 of such shape in section as shown in FIG. 10 can be obtained in finished form according to one embodiment of the present invention.

With the multifaceted hologram plate 125 according to the present invention, all the unit holograms can be precisely replicated because the unit hologram plates 120 are kept flush with one another by one common thin sheet glass 121 provided over the unit hologram plates 120 put in good alignment. When the hologram photosensitive material is brought into close contact with the multifaceted hologram plate 125 with an index matching liquid applied therebetween for the purpose of hologram replication, it is extremely unlikely that the optical adhesive agent 122 between adjacent unit holograms 120 will be dissolved in the index matching liquid (e.g., xylene) because the thin sheet glass 121 is provided over the multifaceted hologram plate 125.

Fabricated by the lamination of only unit hologram plates 120 put in good alignment with good properties, the multifaceted hologram plate 125 according to the present invention have all unit hologram plates of good quality and uniform properties, and so can be used for hologram replication with high efficiency.

Regarding the aforesaid embodiment, it is noted that the PVA layer 103 or thin sheet glass 105 may be omitted from the unit hologram plate 120.

It is also noted that the hologram to be replicated may be of either the transmission or the reflection type, and that it is not always necessary to replicate the multifaceted hologram plate 125 by the double-focus replication process.

The hologram plate for achieving the third object of the present invention is now explained.

A transmission type hologram is recorded by entering object light and reference light in a hologram dry plate from the same side and allowing both for interference in a hologram photosensitive material layer of the hologram dry plate. The thus recorded transmission type hologram or a transmission type computer-generated hologram (transmission type CGH) obtained by computing interference fringes by means of a computer, and rendering the interference fringes by means of electron beams to form the interference fringes on a substrate by photolithography is used as a transmission type hologram plate. Another hologram dry plate is brought into close contact with or spaced slightly away from the side of the transmission type hologram plate that faces away from the reconstructing illumination light incident side thereof. Replicating illumination light corresponding to the reconstructing illumination light is entered in the resultant multilayer structure from the hologram plate to allow diffracted light corresponding to the object light and transmitted light corresponding to the reference light to interfere in the hologram photosensitive material layer of the hologram dry plate, so that a transmission type hologram similar properties to the hologram plate is replicated.

A reflection type hologram is recorded by entering object light and reference light in a hologram dry plate from opposite sides to allow both to interfere in a hologram photosensitive material layer of the hologram dry plate. The thus recorded reflection type hologram is used as a reflection type hologram plate. Another hologram dry plate is brought into close contact with or spaced slightly away from the side of the reflection type hologram plate, on which reconstructing illumination light is incident. Replicating illumination light corresponding to the reconstructing illumination light is entered in the multilayer structure from the hologram dry plate side to allow diffracted light corresponding to object light and the replicating illumination light corresponding to reference light to interfere in the hologram photosensitive material layer of the hologram dry plate, so that a reflection type hologram similar in properties to the hologram plate is replicated.

The thus replicated transmission type hologram or reflection type hologram is used as a fresh hologram plate for similar replication, whereby a number of transmission or reflection type holograms having similar properties can be fabricated.

However, such a hologram plate as mentioned above—which, unless otherwise stated, is understood to include both a transmission type hologram plate and a reflection type hologram plate—is susceptible to surface marring, wearing and contamination as it is repeatedly used for replication. Such defects are caused by repeated contact of the hologram plate with a hologram dry plate using a photopolymer or the like as a hologram photosensitive material or a spacer used in a hologram replication process using such a spacer (FIGS. 12 and 13). For this reason, a protective film is generally provided over the surface of the hologram plate. However, this protective layer, too, is damaged by marring, wearing and contamination to such a degree that it can no longer be used, as it is used over an extended period.

The third object of the present invention is to provide an easily releasable, hologram plate-protecting film for preventing surface marring, wearing and contamination which may otherwise occur in the contact replication process or when foreign matters are removed. One embodiment of the present invention in this regard is now explained.

Figure 11:
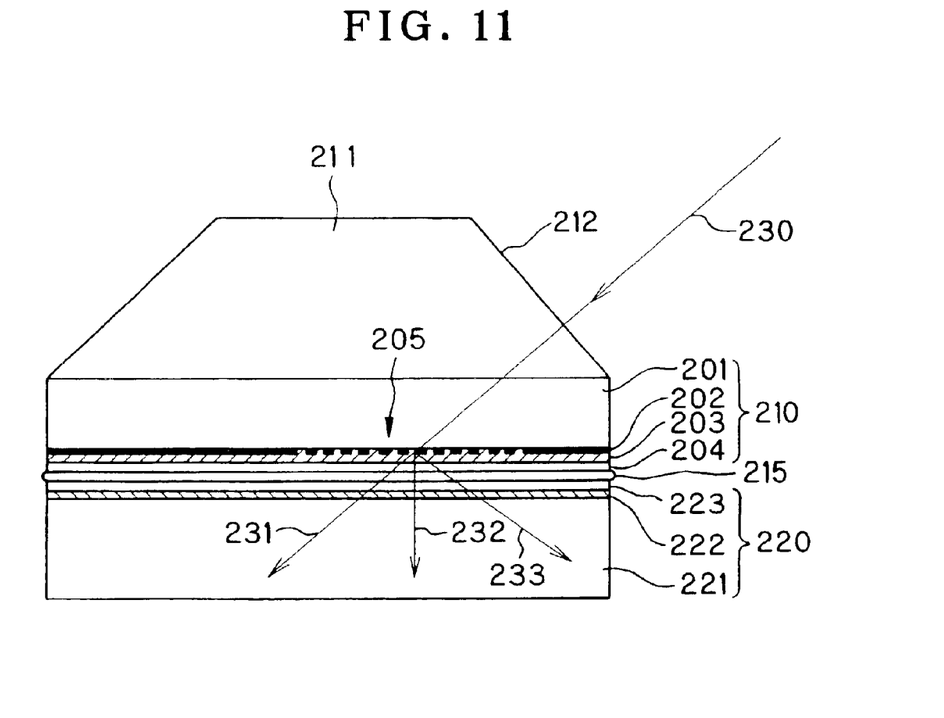
FIG. 11 is illustrative of how to fabricate a transmission type hologram using the hologram plate of the invention for the purpose of achieving the third object of the invention.

FIG. 11 is a sectional view of how to replicate a transmission type hologram using the hologram plate according to this embodiment. As typically set forth in JP-A's 11-6917 and 11-271535, a hologram plate 210 is prepared by forming a metal film 202 formed of Cr on a transparent substrate 201 and using electron beams to pattern interference fringes for a hologram color filter as an example by means of photolithography, thereby forming an amplitude type computer-generated hologram pattern 205 thereon.

Then, the metal film 202 with such an amplitude type computer-generated hologram pattern 205 formed thereon is provided thereon with a first layer 203 capable of being removed by water or a solvent according to the present invention. Finally, the first layer 203 is provided thereon with a second layer 204 formed of a curing resin capable of being cured by light or heat. In this way, the transmission type hologram plate 204 according to the present invention is fabricated.

In this embodiment, the second layer 204 formed on the surface of the hologram plate 210—which surface comes into close contact with a hologram dry plate 220 or the like—functions as a protective layer for the finely patterned hologram layer 202, thereby preventing the marring, wearing and contamination of the hologram layer 202, which may otherwise occur at steps of coating an index matching liquid, carrying out contact replication, removing the index matching liquid, removing foreign matters, and so on.

The light or heat-curable resin layer 204 is usually of high hardness. However, as many holograms are replicated, the protective layer 204, too, is subjected to marring, wearing and contamination at the steps of coating an index matching liquid, carrying out contact replication, removing the index matching liquid, removing foreign matters, and so on.

In this case or, for instance, when one fails to form the first layer 203 or the second layer 204, the hologram plate 210 is washed with water or boiled in boiling water, so that the protective layer 204 can be easily removed because the first layer 203 is dissolved in water or boiling water. Then, if fresh first and second layers 203 and 204 are provided on the hologram layer 202, the hologram plate 210 can then be regenerated.

This embodiment of the present invention is now explained with reference to one specific example. A hologram plate 210 was prepared by forming an about 0.05 $\mu$m thick Cr film 202 on a quartz substrate 201 (n=1.46) and rendering and patterning interference fringes for a color filter by means of photolithography using electron beams to form a hologram pattern 205.

On the other hand, 0.8% by weight of a red dye (Kayafect Red G.C.I. Direct R-23, Nippon Kayaku Co., Ltd.) wad added to and dissolved in a 10% (solid content) aqueous solution of polyvinyl alcohol to prepare a colored aqueous polyvinyl alcohol solution. By means of spin coating, this aqueous solution was coated on the Cr film 202 of the hologram plate 210 with the hologram pattern 205 formed thereon, and then dried at room temperature for 1 hour and 70° C. for a further 1 hour to obtain a light absorbing layer 203 of about 1 $\mu$m in thickness. This light absorbing layer 203 had a refractive index of n=1.52.

Then, an ultraviolet curing resin (Seikabeam EXG-75-1, Dainichi Seika Industries, Ltd.) was coated on the light absorbing layer 203 by means of spin coating, then dried at 60° C. for 1 hour, then irradiated with 2,000 mJ ultraviolet radiation from an ultraviolet lamp including all wavelength components 250 nm, 330 nm and 360 nm to cure the resin, and finally dried at 70° C. for 2 hours to bring the formation of a protective layer 204 of about 2 $\mu$m in thickness to completion. The ultraviolet-cured resin layer 204 had a refractive index of n=1.53.

The thus fabricated hologram plate 210 was used for the replication of a hologram color filter in the arrangement of FIG. 11. To this end, a hologram dry plate 220 is prepared by laminating a hologram photosensitive material layer 222 comprising a photopolymer on a transparent substrate 221 and laminating a protective layer 223 on the surface of the layer 222. The protective layer 204 of the hologram plate 210 is brought into close contact with the protective layer 223 of the hologram dry plate 220 with an index matching liquid 215 interleaved therebetween while a prism 211 having an inclined surface 212 is brought into close contact with the back surface of the hologram plate 210. Laser light of 514 nm wavelength is entered in the inclined surface 212 to enter replicating illumination light 230 in the hologram layer 202 of the hologram plate 210 at a large angle of incidence.

Zero-order transmitted light 231, first-order diffracted light 232 and second-order diffracted light 233 are generated from the hologram pattern 205. However, the zero-order transmitted light 231 and second-order diffracted light 233 are higher in attenuation factor than the first-order diffracted light 232, because the first-order diffracted light 232 is almost vertical with respect to the hologram layer 202 whereas the zero-order transmitted light 231 and second-order diffracted light 233 have a large angle of diffraction with respect to the hologram layer 202 and so the length of an optical path passing through the light absorbing layer 203 becomes relatively long with respect to the zero-order diffracted light 231 and second-order diffracted light 233. Of the zero-order transmitted light 231, first-order diffracted light 232 and second-order diffracted light 233, the zero-order transmitted light 231 has the highest light intensity and the second-order diffracted light 233 has the lowest light intensity. Through the action of this light absorbing layer 203, it is thus possible to make the intensities of the zero-order transmitted light 231 and first-order diffracted light 232 substantially equal to each other upon arrival at the hologram photosensitive material layer 222 of the hologram dry plate 220 and, hence, reduce the relative intensity of the second-order diffracted light 233 extremely. Thus, the insertion of the light absorbing layer 203 in the hologram plate 210 makes unnecessary interference fringes due to the second-order diffracted light 233 unlikely to occur. The zero-order transmitted light 231, first-order diffracted light 232, second-order diffracted light 233, etc. attenuated through the light absorbing layer 203 are again incident on the hologram layer 202 after Fresnel reflection at interfaces of the hologram dry plate 220 (the surface of the protective layer 223, the interface between the protective layer 223 and the hologram photosensitive material layer 222, the interface between the hologram photosensitive material layer 222 and the transparent substrate 221, and the back surface of the transparent substrate 221). However, the reflected light is attenuated through the light absorbing layer 203 and its light intensity is sufficiently reduced upon arrival at the hologram photosensitive material layer 222. Thus, unnecessary interference fringes due to the reflected light from these interfaces, too, are unlikely to occur because of the presence of the light absorbing layer 203.

The zero-order transmitted light 231 and first-order diffracted light 232 generated from the hologram plate 210 interfere in the hologram photosensitive material layer 222 of the hologram dry plate 220, so that a transmission type hologram similar in diffraction properties to the hologram plate 210 is replicated in the hologram dry plate 220.

A hologram plate with no protective layer provided thereon is susceptible to marring. For instance, a fine patterning (205) broken down in the process of about 500 replication cycles. However, a hologram plate with such a protective layer 204 provided thereon according to the present invention could stand up to 10,000 or more replication cycles. This protective film, even when more or less damaged, had no adverse influence on replication because the refractive index of the ultraviolet curing resin layer 204 was nearly equal to that of the index matching liquid 215 (cardinal oil; n=1.515). Removal of the protective layer 204 is achieved by placing and boiling the hologram plate 210 in boiling water to dissolve the light absorbing layer 203 therein. The merit of this method is that no access to the patterned surface 205 is needed. By removing and regenerating the protective layer 204 per 10,000 replication cycles, the hologram plate 210 could be protected on a semi-permanent basis.

While the hologram plate for achieving the third object of the present invention has been described with reference to its specific embodiment and example, it is understood that the present invention is not limited thereto, and so many modifications may be made. The hologram plate of the present invention is applicable to not only the transmission type but also the reflection type. It is also understood that the first layer 203 capable of being removed by water or a solvent and the second layer 204 provided thereon and formed of a curing resin capable of being cured by light or heat can be provided on not only the amplitude type hologram layer with a metal film patterned thereon but also a hologram layer comprising a photopolymer or other hologram photosensitive material layer with interference fringes recorded therein.

It is not always necessary to provide such layers directly on the hologram layer 202. In the replication process using a spacer for instance, the first layer 203 capable of being removed by water or a solvent and the second layer 204 provided thereon and formed of a curing resin capable of being cured by light or heat may be formed on the surface of the spacer.

While the hologram plate and its fabrication process of the present invention have been described with reference to some specific embodiments, it is understood that the present invention is not limited thereto, and so many modifications may be made.

In the present invention for the purpose of achieving the aforesaid first object, the hologram plate comprises a multilayer structure made up of a first transparent substrate, a hologram layer, an adhesive layer and a second transparent layer and the second transparent substrate defines a surface in contact with a hologram photosensitive material during hologram replication, so that the second transparent substrate can function as a protective layer to make the hologram plate resistant to marring. In addition, the second transparent substrate can be used as a spacer for the double-focus replication process wherein the distance between the hologram plate and the hologram photosensitive material is set at substantially double the focal length of each collective element hologram, so that replicas can be fabricated with constant focal lengths.

An absorbing layer is located between the hologram layer and the adhesive layer or at other position to allow the zero-order light and first-order light diffracted by the hologram layer to have substantially the same intensity, so that hologram replicas of high diffraction efficiency can be obtained.

According to the present invention for achieving the aforesaid second object, all the unit holograms can be precisely replicated because the unit hologram segments are kept flush with one another by one common thin sheet glass provided over the plurality of juxtaposed unit hologram segments. When the hologram photosensitive material is brought into close contact with the multifaceted hologram plate with an index matching liquid applied therebetween for the purpose of hologram replication, it is extremely unlikely that an optical adhesive agent between adjacent unit hologram segments will be dissolved in the index matching liquid. If a glass sheet is used as the transparent thin sheet, improved durability is then obtained. Fabricated by the lamination of only unit hologram segments put in good alignment with good properties, the multifaceted hologram plate according to the present invention for achieving the aforesaid second object have all unit hologram segments of good quality and uniform properties, and so can be used for hologram replication with high efficiency.

According to the present invention for achieving the aforesaid third object, there is provided a hologram plate comprising a hologram layer with interference fringes formed thereon, a first layer capable of being removed with water or a solvent, which is provided on the surface of said hologram layer or a transparent layer formed thereon, and a second layer of a curing resin capable of being cured by light or heat, which is formed on said first layer. The second layer functions as a protective layer for the hologram layer, thereby preventing the marring, wearing and contamination of the hologram layer, which may otherwise occur at steps of coating an index matching liquid, carrying out contact replication, removing the index matching liquid, removing foreign matters, and so on. As many holograms are replicated, the second layer, too, is subjected to marring, wearing and contamination. In this case or, for instance, when one fails to form the first layer or the second layer, the hologram plate is washed with water or boiled in boiling water, so that the protective layer can be easily removed. Then, if fresh first and second layers are provided on the hologram layer, the hologram plate can be regenerated.

The hologram plate for achieving the third object of the present invention comprises a hologram layer with interference fringes formed thereon, a first layer capable of being removed with water or a solvent, which is provided on the surface of said hologram layer or a transparent layer formed thereon, and a second layer of a curing resin capable of being cured by light or heat, which is formed on said first layer. The second layer functions as a protective layer for the hologram layer, thereby preventing the marring, wearing and contamination of the hologram layer, which may otherwise occur at steps of coating an index matching liquid, carrying out contact replication, removing the index matching liquid, removing foreign matters, and so on. As many holograms are replicated, the second layer, too, is subjected to marring, wearing and contamination. In this case or, for instance, when one fails to form the first layer or the second layer, the hologram plate is washed with water or boiled in boiling water, so that the protective layer can be easily removed. Then, if fresh first and second layers are provided on the hologram layer, the hologram plate can be regenerated.

What we claim is:

1. A hologram plate comprising an array of a transmission type of collective element holograms that diffract parallel light incident thereon at a specific wavelength and a specific incident angle in such a way that the parallel light is converged on a specific focal length position, which comprises a multilayer structure made up of a first transparent substrate, a hologram layer, an adhesive layer and a second transparent substrate, said second transparent substrate defining a surface in contact with a hologram photosensitive material when hologram replication is carried out, wherein said second transparent substrate has a thickness substantially double the focal length of each collective element hologram, inclusive of the thickness of said adhesive layer.

2. The hologram plate according to claim 1, wherein between said hologram layer and said adhesive layer there is interleaved a water-soluble protective layer.

3. The hologram plate according to claim 2, wherein said second transparent substrate has a thickness substantially double the focal length of each collective element hologram, inclusive of the thicknesses of said adhesive layer and said water-soluble protective layer.

4. The hologram plate according to claim 1, wherein said hologram layer has a diffraction efficiency preset in such a way as to allow zero-order light and first-order light diffracted by said hologram layer to have substantially the same intensity.

5. The hologram plate according to claim 1, wherein an absorbing layer is located at any desired position between said hologram layer and said second transparent layer, and a light-absorbing material is dispersed throughout said absorbing layer in such a way so as to allow zero-order light and first-order light diffracted by said hologram layer to have substantially the same intensity.

6. The hologram plate according to claim 1, wherein an absorbing layer is located on the surface of said second transparent layer, and a light-absorbing material is dispersed throughout said absorbing layer in such a way so as to allow zero-order light and first-order light diffracted by said hologram layer to have substantially the same intensity.

7. In a hologram plate as recited in claim 1, on the surface of the plate in contact with replication product a a hologram layer with interference fringes formed thereon, a first layer capable of being removed with water or a solvent, which is provided on the surface of said hologram layer or a transparent layer formed thereon, and a second layer of a curing resin capable of being cured by light or heat, which is formed on said first layer.

8. The hologram plate according to claim 7, wherein said hologram layer is an amplitude type hologram layer with a metal film patterned thereon.

9. The hologram plate according to claim 7, wherein said hologram layer is a hologram layer comprising a hologram photosensitive material layer with interference fringes recorded therein.

10. The hologram plate according to claim 7, wherein said first layer is capable of absorbing light.

11. The hologram plate according to claim 7, which comprises a transmission type hologram.

12. The hologram plate according to claim 7, which comprises a reflection type hologram.

13. A process for fabricating a hologram plate comprising an array of a transmission type of collective element holograms that diffract parallel light incident thereon at a specific wavelength and a specific incident angle in such a way that the parallel light is converged on a specific focal length position, said hologram plate comprising a multilayer structure made up of a first transparent substrate, a hologram layer, an adhesive layer and a second transparent substrate, and said second transparent substrate defining a surface in contact with a hologram photosensitive material when hologram replication is carried out, said second transparent substrate has a thickness substantially double the focal length of each collective element hologram, inclusive of the thickness of said adhesive layer, wherein:

said adhesive layer comprises an ultraviolet curing adhesive agent, said multilayer structure, obtained by forming said hologram layer on said first transparent substrate and then superposing said second transparent substrate on said hologram layer with an uncured ultraviolet curing adhesive agent interleaved therebetween, is spun to spin an extra portion of said adhesive agent out of the periphery thereof, thereby making said adhesive layer uniform, while the rpm of said multilayer structure is controlled to obtain a desired thickness, and said multilayer structure is irradiated with ultraviolet radiation through said first transparent substrate or said second transparent substrate to cure said adhesive agent.

14. The hologram plate fabrication process according to claim 13, wherein said hologram is exposed to p-polarized light.

15. The hologram plate fabrication process according to claim 13, wherein said hologram is exposed to s-polarized light.

* * * * *